United States Patent Office 3,749,792
Patented July 31, 1973

3,749,792
METHOD OF PREPARING BORIC OXIDE
Thomas M. Cromwell, Lancaster, and Robert W. Sprague, Santa Ana, Calif., assignors to United States Borax & Chemical Corporation, Los Angeles, Calif.
No Drawing. Continuation-in-part of abandoned application Ser. No. 676,705, Oct. 20, 1967. This application July 16, 1971, Ser. No. 163,465
Int. Cl. C01b 35/00
U.S. Cl. 423—278
9 Claims

ABSTRACT OF THE DISCLOSURE

Boric oxide is produced by heating boric acid containing up to about 6% alkali metal chloride or sulfate and from about 1 to 25% free water to a temperature of at least about 900° C. Preferably a temperature of 950° to 1100° C. is employed.

---

This application is a continuation-in-part of our copending application Ser. No. 676,705 filed Oct. 20, 1967, and now abandoned.

This invention relates to the production of boric oxide or anhydrous boric acid and, more particularly, it relates to a method for producing boric oxide from boric acid containing alkali metal sulfates or chlorides and free water.

Boric oxide has been traditionally manufactured by dehydration of purified or recrystallized boric acid, such as by fusing by heating at an elevated temperature in a furnace, cooling, and then grinding the resultant fused product to give a 99%+ pure product. Because of the multiplicity of steps involved in purifying a crude boric acid by recrystallization, filtering, drying, etc. the process is inherently expensive.

According to the present invention, it has been found that a significant saving in costs can be achieved by fusing a crude non-recrystallized boric acid containing specifically defined impurities within certain limits, including free water. The boric oxide product obtained is essentially pure, the major impurity being a very small amount of alkali metal oxide such as sodium oxide or potassium oxide which is not harmful in most uses of boric oxide.

The crude boric acid employed in the present process can be obtained by the well-known method of reacting an alkali metal borate, such as sodium borate or potassium borate, with a mineral acid, such as sulfuric acid or hydrochloric acid, while slurried in a solution that is saturated with boric acid, but not saturated with the corresponding sulfate or chloride salt. After reaction to the alkali metal borate with the acid in this medium, the sulfate or chloride by-product dissolves while the boric acid is precipitated. This crude boric acid is separated from the reaction medium such as by a filter or centrifuge, together with a certain amount of adhering liquor. It may or may not be washed with some wash liquid, depending upon the type of separation device used.

Upon fusing and dehydration, boric acid loses about 44% of its weight due to the loss of water. Since the crude boric acid obtained as described above usually contains from about 1 to about 4% alkali metal sulfate or chloride, it would be reasonable to expect that the boric acid oxide product should contain from about 1.8 to 6.9% of the sulfate or chloride. This amount of impurity is unacceptable for many applications. It has been discovered, however, that the boric oxide product obtained by the method of the present invention does not contain the expected high level of sulfate or chloride contaminants but actually contains 0.1% or less sulfate or choride, provided the necessary reaction conditions are employed.

Thus, according to the present invention, boric oxide is produced by heating boric acid at a temperature of at least about 900° C. for a period of time sufficient to dehydrate the boric acid, said boric acid containing at least about 0.5% and up to about 6% by weight of an alkali metal sulfate or alkali metal chloride and at least about 1% free water. If the boric acid contains more than about 6% of these salts, phase separation occurs and the process becomes more complex because of the necessity of additional separation procedures.

Preferably, the boric acid employed in the present process has from about 1 up to about 3.5% or less alkali metal sulfate or alkali metal chloride as impurities. The sodium and potassium sulfates and chlorides are preferred. The crude boric acid also contains at least about 1% free water, preferably up to about 15% free water, although greater amounts such as up to about 25% can be used if desired. Thus, the process readily employs a crude, damp non-recrystallized boric acid as the feed material.

The crude boric acid is heated at an elevated temperature of at least about 900° C. in a suitable furnace, such as a gas-fired furnace. The time of heating should be sufficient to dehydrate and refine the boric acid. Generally a retention time of from about 15 minutes to 2 hours is sufficient to substantially dehydrate and refine all the boric acid at temperatures of above 900° C. Although a preferred reaction temperature is in the range of from about 950° to about 1100° C., higher temperatures can be used if desired. However, such higher temperatures may result in increased loss of product due to vaporization.

The following examples illustrate the method of the present invention but it is to be understood that the invention is not to be limited to the specific examples given.

EXAMPLE I

A sample of crude boric acid containing 1.75% by weight sodium sulfate and 10% by weight water was dehydrated by heating in a platinum crucible at 1000° C. for 20 minutes. After cooling, the clear, glassy boric oxide product was analyzed and found to contain 95.7% $B_2O_3$, 1.5% $Na_2O$ and 0.17% $Na_2SO_4$.

EXAMPLE II

A sample of the same crude boric acid described in Example I was heated in a platinum crucible at 800° C. for 20 minutes. Analysis of the resultant boric oxide product showed it to contain 95.2% $B_2O_3$ and 3.4% $Na_2SO_4$.

This example illustrates the necessity of using reaction temperatures of at least about 900° C.

EXAMPLE III

A sample of crude boric acid containing 3.0% sodium sulfate and 10% water was dehydrated by heating in a platinum crucible for one hour at 1000° C. The resultant boric oxide product analyzed 96.3% $B_2O_3$, 2.5% $Na_2O$ and 0.12% $Na_2SO_4$.

EXAMPLE IV

Dehydration of crude boric acid containing calcium sulfate in a platinum crucible for 30 minutes at 1000° C. gave a two-phase product mixture.

EXAMPLE V

The method of this invention is readily adapted to a continuous process in which crude boric acid is continuously fed to a furnace and the molten boric oxide product is continuously taken off. In one such run, boric acid containing 2.5% sodium sulfate and 12% free water was continuously fed to a gas-fired furnace maintained at a temperature of about 980°–1040° C. The boric oxide was continuously discharged from the furnace as a molten stream and fed to chilled rolls where it solidified. It then falls off or is scraped off, was cooled, and crushed to the desired size to provide a fused, glassy boric oxide product. The product analyzed 96.7% $B_2O_3$, 1.66% $Na_2O$ and 0.12% $Na_2SO_4$.

EXAMPLE VI

A sample of crude boric acid containing 5% free water and 2% sodium chloride was dehydrated by heating in a platinum crucible for 20 minutes at 1000° C. The resultant boric oxide product analyzed 97.63% $B_2O_3$, 0.89% $Na_2O$ and <0.001% NaCl.

EXAMPLE VII

A sample of crude boric acid containing 20% free water and 2.8% sodium sulfate was dehydrated by heating in a platinum crucible for one hour at 1000° C. The resultant boric oxide product analyzed 97.81% $B_2O_3$, 1.76% $Na_2O$ and 0.26% $Na_2SO_4$.

Various changes and modifications of the invention can be made and, to the extent that such variations incorporate the spirit of this invention, they are intended to be included within the scope of the appended claims.

What is claimed is:

1. In the method for producing boric oxide by dehydration of boric acid, the improvement which comprises heating crude boric acid containing from about 0.5% to about 6% by weight sodium sulfate, potassium sulfate, potassium chloride, or sodium chloride and about 1% to 25% by weight of free water at a temperature of at least about 900° C. for a period of time sufficient to dehydrate said crude boric acid and produced boric oxide which is essentially free of said sodium sulfate, potassium sulfate, potassium chloride or sodium chloride contaminant.

2. The method according to claim 1 in which said crude boric acid is crude damp boric acid obtained from reaction of sodium borate or potassium borate with sulfuric or hydrochloric acid in an aqueous medium.

3. The method according to claim 1 in which said crude boric acid is heated at a temperature of from about 950° C. to about 1100° C.

4. The method according to claim 1 in which said crude boric acid contains from about 1% to about 3.5% by weight sodium sulfate.

5. The method according to claim 1 in which said crude boric acid contains from about 1% to about 3.5% by weight sodium chloride.

6. The method according to claim 1 in which said crude boric acid contains up to about 15% free water.

7. The method for producing boric oxide essentially free of sulfate which comprises heating crude boric acid containing from about 1 to about 3.5% by weight sodium sulfate and from about 1 to about 15% by weight of free water at a temperature of at least about 900° C. for a period of time sufficient to dehydrate said crude boric acid.

8. The method in accordance with claim 7 in which said crude boric acid is heated at a temperature of from about 950° C. to about 1100° C.

9. The method in accordance with claim 7 in which said period of time is from about 15 minutes to 2 hours.

References Cited

UNITED STATES PATENTS

| | | | |
|---|---|---|---|
| 2,893,838 | 7/1959 | Stern et al. | 23—149 |
| 2,113,248 | 4/1938 | Berg | 23—149 |
| 2,137,058 | 11/1938 | McCulloch | 23—149 |
| 3,450,497 | 6/1969 | Schumacher et al. | 23—149 |
| 3,468,627 | 8/1969 | Fusby | 23—149 |
| 3,582,272 | 6/1971 | Stanton | 23—149 |

FOREIGN PATENTS

| | | | |
|---|---|---|---|
| 1,253,073 | 12/1960 | France | 23—149 |

HERBERT T. CARTER, Primary Examiner